United States Patent
Dressler et al.

(10) Patent No.: US 7,472,235 B2
(45) Date of Patent: Dec. 30, 2008

(54) MULTI-INTERFACED MEMORY

(75) Inventors: David Dressler, Loomis, CA (US); Sean Eilert, Penryn, CA (US)

(73) Assignee: Intel Corporation, Santa Clara, CA (US)

( * ) Notice: Subject to any disclaimer, the term of this patent is extended or adjusted under 35 U.S.C. 154(b) by 257 days.

(21) Appl. No.: 11/291,801

(22) Filed: Nov. 30, 2005

(65) Prior Publication Data

US 2007/0124544 A1    May 31, 2007

(51) Int. Cl.
*G06F 13/00*    (2006.01)
(52) U.S. Cl. .......................... 711/149; 711/167; 711/1; 710/38
(58) Field of Classification Search ........................ None
See application file for complete search history.

(56) References Cited

U.S. PATENT DOCUMENTS

| | | | |
|---|---|---|---|
| 6,522,648 B1 * | 2/2003 | Heering et al. | 370/363 |
| 6,859,410 B2 * | 2/2005 | Scheuerlein et al. | 365/230.06 |
| 6,894,941 B2 * | 5/2005 | Kurjanowicz et al. | 365/222 |
| 2003/0182522 A1 * | 9/2003 | Yoo et al. | 711/156 |
| 2005/0204090 A1 | 9/2005 | Eilert | |
| 2005/0281095 A1 | 12/2005 | Eilert | |

* cited by examiner

*Primary Examiner*—B. James Peikari
(74) *Attorney, Agent, or Firm*—Trop, Pruner & Hu, P.C.

(57) ABSTRACT

A multi-interfaced memory device includes an array of memory cells having a first interface and a second interface. The first interface and the second interface share an address bus and a data bus. One of the interfaces may be a random access memory interface and the second interface may be a paged access interface.

13 Claims, 3 Drawing Sheets

MULTI-INTERFACED MEMORY

BACKGROUND

DESCRIPTION OF THE RELATED ART

Embodiments of the present invention relate generally to memory devices. Memory devices are used in many different types of systems to store code and data. Code and data are sometimes stored in two separate memories due to their access requirements. For example, code is typically written to a memory device as a large block of data during system manufacturing or code installation or update. Code is read in a random fashion, directed by program counters, jumps and branches in software routines. Most data is written or read in blocks during application processing.

Methods and apparatuses are being developed to improve systems overall, including memory throughput, system cost, and the like.

A dual ported random access memory (RAM) is a two-ported memory device that provides multiple interfaces such that multiple processors can access the same memory. By providing multiple similar interfaces, processor communication and arbitration are managed more efficiently.

BRIEF DESCRIPTION OF THE DRAWINGS

The present invention may be better understood, and its numerous features and advantages made apparent to those skilled in the art by referencing the accompanying drawings.

The use of the same reference symbols in different drawings indicates similar or identical items.

DESCRIPTION OF THE EMBODIMENT(S)

In the following description, numerous specific details are set forth. However, it is understood that embodiments of the invention may be practiced without these specific details. In other instances, well-known methods, structures and techniques have not been shown in detail in order not to obscure an understanding of this description.

References to "one embodiment," "an embodiment," "example embodiment," "various embodiments," etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Unless specifically stated otherwise, as apparent from the following discussions, it is appreciated that throughout the specification discussions utilizing terms such as "processing," "computing," "calculating," or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data from registers and/or memory to transform that electronic data into other electronic data that may be stored in registers and/or memory. A "computing platform" may comprise one or more processors.

Figure 1:
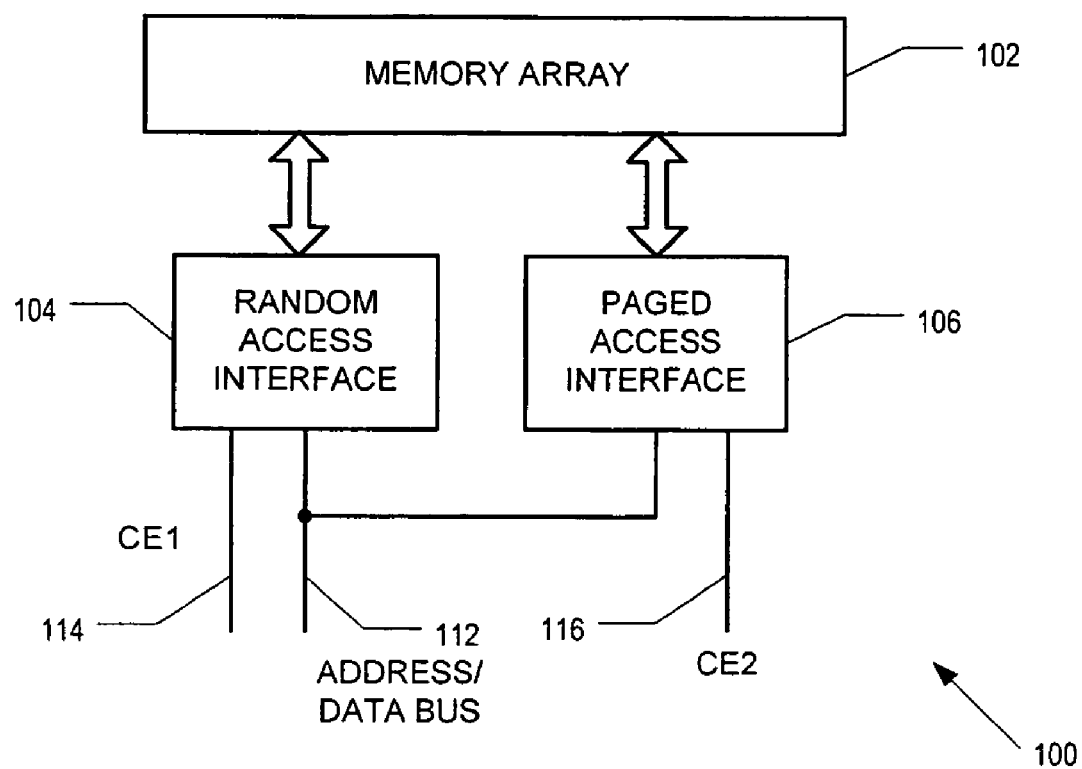
FIG. 1 illustrates a multi-interfaced memory device according to an embodiment of the present invention.

FIG. 1 illustrates a multi-interfaced memory device according to an embodiment of the present invention. Memory device 100 includes an array of memory cells 102, a random access interface 104 and a paged access interface 106. An address/data bus 112 provides address and data communication paths to both random access interface 104 and paged access interface 106. A chip enable 114 selects random access interface 104 for access and a chip enable 116 selects paged access interface 106 for access. Because address/data bus 112 is shared between random access interface 104 and paged access interface 106, chip enable 114 and chip enable 116 are mutually exclusive, that is, they both cannot be active concurrently.

Every location in memory array 102 may be access by both random access interface 104 and paged access interface 106. Code reads and data reads have different requirements from a system perspective. For code reads, typically random accesses, memory latency should be predictable and as fast as possible. For data reads, typically paged accesses, memory latency is not as important. Instead, when a file system reads data, data should be available in large amounts, for example, pages or sectors.

By providing two operationally different interfaces to the same array or memory, a single memory device may be used to support both code and data accesses. A first portion of memory array 102 may be used to store code that may be accessed using random access interface 104, for example, for the purpose of code execution. A second portion of memory array 102 may be used to store data that may be accessed using paged access interface 106, for example, using a paged access software interface.

According to some embodiments of the present invention, code may be written to memory array 102 using paged access interface 106 during factory manufacture or code updates, and read during program execution using random access interface 104.

According to some embodiments of the present invention, multi-interfaced memory device 100 provides the appearance to the system that there are two separate devices with different types of interfaces residing on the same bus. The different interfaces may have different access timing, different software interfaces, or even look like different memory technologies.

Figure 2:
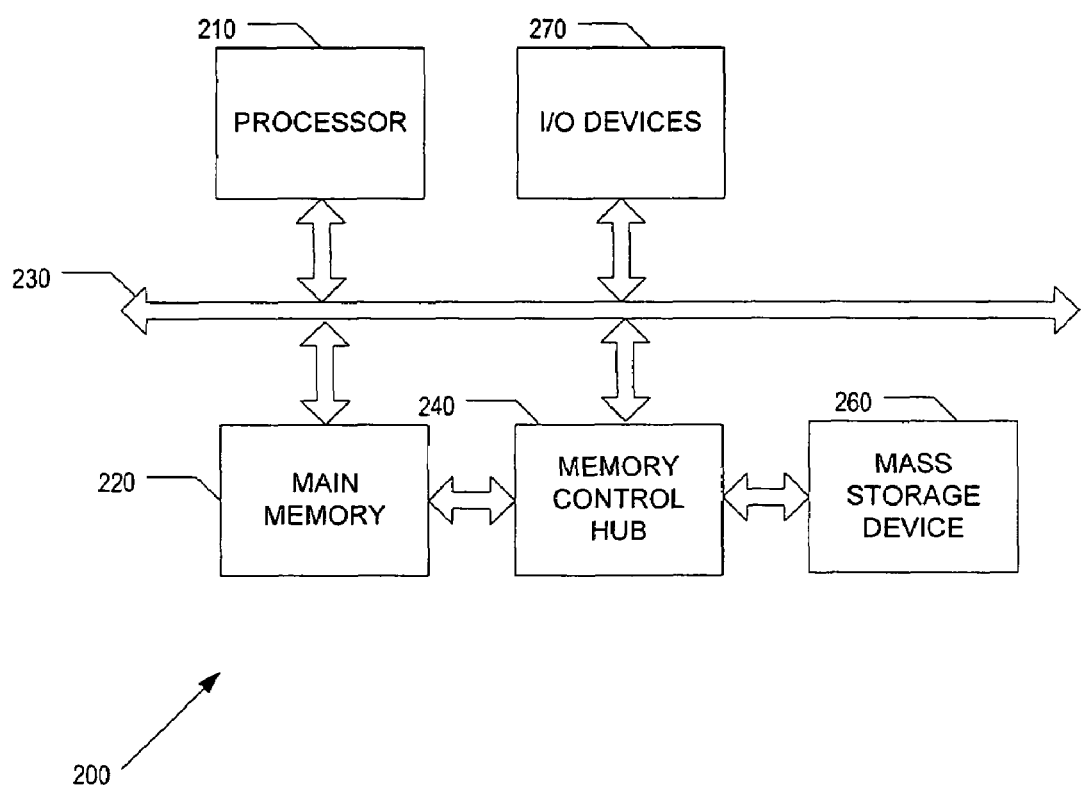
FIG. 2 illustrates a system utilizing a multi-interfaced memory device according to an embodiment of the present invention.

FIG. 2 illustrates a system utilizing a multi-interfaced memory device according to an embodiment of the present invention. System 200 includes a processor 210 coupled to a main memory 220 by a bus 230. Main memory 220 may include a random-access-memory (RAM) and be coupled to a memory control hub 240. Memory control hub 240 may also be coupled to bus 230 and to a mass storage device 260. Mass storage device 260 may be a hard disk drive, a floppy disk drive, a compact disc (CD) drive, a Flash memory (NAND and NOR types, including multiple bits per cell), or any other existing or future memory device for mass storage of information. Memory control hub 240 controls the operations of main memory 220, and mass storage device 260. A number of input/output devices 270 such as a keyboard, mouse and/or display may be coupled to bus 230.

Main memory 220 and/or mass storage device 260 may be multi-interface memory devices according to embodiments of the present invention. Memory control hub 240 may receive a memory access request for main memory 220 or mass storage device 260. The memory access request may include a virtual address which is decoded by memory control hub 240. Memory control hub 204 selects an appropriate interface for access based on, for example, the address and/or the type of memory access. In an alternate embodiment of the present invention, processor 210 performs address decoding and interface selection internally.

Although system 200 is illustrated as a system with a single processor, other embodiments may be implemented with multiple processors, in which additional processors may be coupled to the bus 230. In such cases, each additional processor may share main memory 220 for writing data and/or instructions to and reading data and/or instructions from the same and share mass storage device 260.

Figure 3:
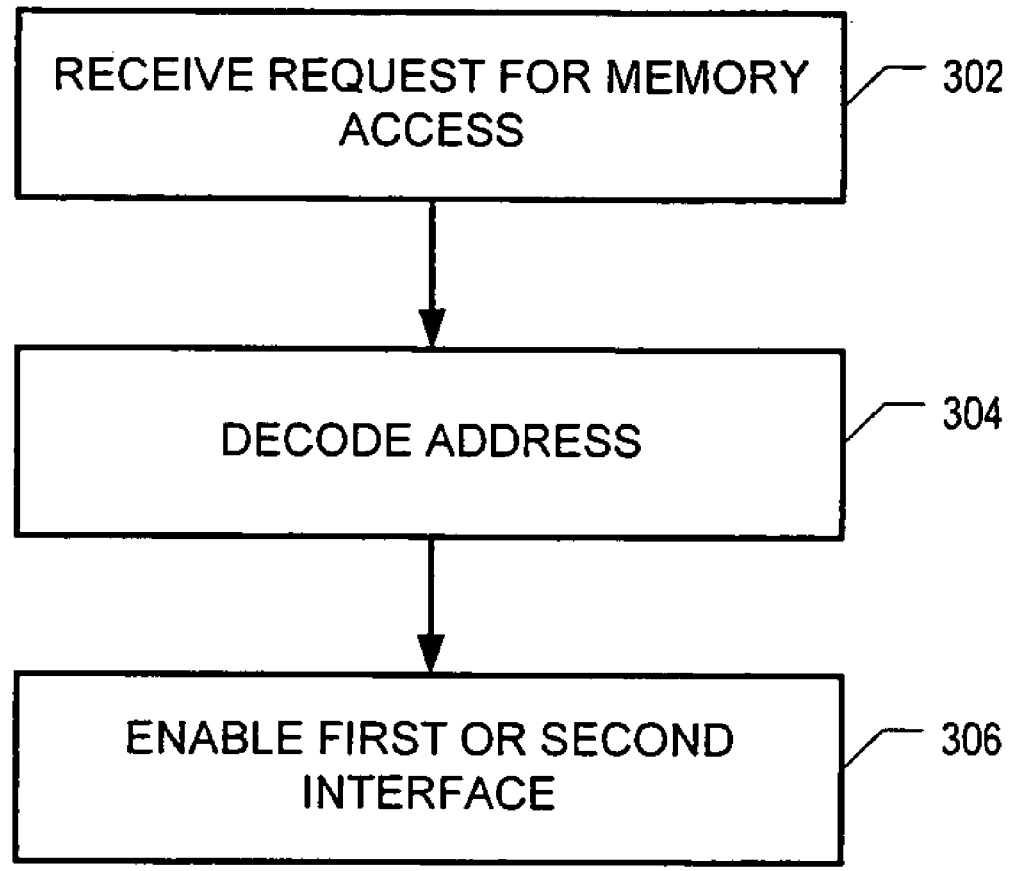
FIG. 3 illustrates a flow diagram of a memory controller accessing a multi-interfaced memory device according to an embodiment of the present invention.

FIG. 3 illustrates a flow diagram of a memory controller accessing a multi-interfaced memory device according to an embodiment of the present invention. A memory access request is received, for example, by a memory controller, block 302. The memory access may be, for example, a read, a write, or an erase request. Such request will include an address which is decoded, block 304. The address may be a virtual address that relies on memory mapping. Based on the address and/or the request type, a memory interface is enabled, block 306.

The techniques described above may be embodied in a computer-readable medium for configuring a computing system to execute the method. The computer readable media may include, for example and without limitation, any number of the following: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and data transmission media including permanent and intermittent computer networks, point-to-point telecommunication equipment, carrier wave transmission media, the Internet, just to name a few. Other new and various types of computer-readable media may be used to store and/or transmit the software modules discussed herein. Computing systems may be found in many forms including but not limited to mainframes, minicomputers, servers, workstations, personal computers, notepads, personal digital assistants, various wireless devices and embedded systems, just to name a few. A typical computing system includes at least one processing unit, associated memory and a number of input/output (I/O) devices. A computing system processes information according to a program and produces resultant output information via I/O devices.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

What is claimed is:

1. An apparatus comprising:
    an array of memory cells;
    first interface circuitry to provide access to the array;
    second interface circuitry to provide access to the array; and
    a data bus;
    wherein the first interface circuitry and the second interface circuitry share the data bus;
    wherein the first interface circuitry comprises a random access memory interface and the second interface circuitry comprises a paged access memory interface; and
    wherein the first interface circuitry is configured to provide deterministic initial access latency and the second interface circuitry is configured to allow variable initial access latency.

2. The apparatus as recited in claim 1, wherein the array of memory cells comprises flash memory cells.

3. The apparatus as recited in claim 1, wherein the first interface circuitry is configured to access random memory locations and the second interface circuitry is configured to access page memory locations.

4. The apparatus as recited in claim 1, wherein the first interface circuitry and the second interface circuitry access the memory cells in different quantities.

5. The apparatus as recited in claim 1, wherein the first interface circuitry and the second interface circuitry access the memory cells in a different way.

6. The apparatus as recited in claim 1, wherein each of the first interface circuitry and the second interface circuitry are capable of accessing the entire array of memory cells.

7. The apparatus as recited in claim 6, wherein accessing the entire array comprises reading and writing the entire array.

8. The apparatus as recited in claim 1, wherein the first interface circuitry and the second interface circuitry each have an enable signal.

9. The apparatus as recited in claim 1, wherein the array of memory cells comprises phase change memory cells.

10. The apparatus as recited in claim 1, wherein the array of memory cells comprises magnetic memory cells.

11. A method comprising:
    receiving a memory access request having an address;
    decoding the address; and
    enabling one of a first interface and a second interface to a memory based on results of the decoding the address, the first interface comprising a random access memory interface and the second interface is a paged access memory interface, wherein the first interface is configured to provide deterministic initial access latency and the second interface is configured to allow variable initial access latency.

12. The method as recited in claim 11, wherein the enabling one of the first interface and the second interface comprises activating a first enable signal or a second enable signal.

13. The method as recited in claim 11, wherein the first interface is configured to access random memory locations and the second interface is configured to access block memory locations.

* * * * *